(12) United States Patent
Qafisheh et al.

(10) Patent No.: US 10,487,271 B2
(45) Date of Patent: Nov. 26, 2019

(54) PROCESS FOR IMPROVING PROPYLENE RECOVERY FROM FCC RECOVERY UNIT

(71) Applicant: UOP LLC, Des Plaines, IL (US)

(72) Inventors: Jibreel A. Qafisheh, Prospect Heights, IL (US); Boyd E. Cabanaw, Owasso, OK (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/994,906

(22) Filed: May 31, 2018

(65) Prior Publication Data

US 2018/0273853 A1 Sep. 27, 2018

Related U.S. Application Data

(63) Continuation of application No. PCT/US2016/063923, filed on Nov. 29, 2016.

(60) Provisional application No. 62/268,041, filed on Dec. 16, 2015.

(51) Int. Cl.

| | |
|---|---|
| *C10G 11/18* | (2006.01) |
| *C10G 11/00* | (2006.01) |
| *B01D 5/00* | (2006.01) |
| *B01D 53/00* | (2006.01) |
| *C10G 70/04* | (2006.01) |
| *B01D 1/20* | (2006.01) |
| *B01D 3/06* | (2006.01) |
| *C10L 3/12* | (2006.01) |

(52) U.S. Cl.
CPC ............... *C10G 11/18* (2013.01); *B01D 1/20* (2013.01); *B01D 3/06* (2013.01); *B01D 5/00* (2013.01); *B01D 53/002* (2013.01); *C10G 11/00* (2013.01); *C10G 70/041* (2013.01); *C10G 70/043* (2013.01); *C10L 3/12* (2013.01); *C10G 2300/104* (2013.01); *C10G 2300/1044* (2013.01); *C10G 2300/1088* (2013.01); *C10G 2400/20* (2013.01); *C10L 2290/06* (2013.01); *C10L 2290/30* (2013.01); *C10L 2290/543* (2013.01)

(58) Field of Classification Search
CPC .... C10G 70/041; C10G 70/043; C10G 11/00; C10G 11/18; C10G 2300/1044; C10G 2300/104; C10G 2400/20; B01D 3/06; B01D 5/00; B01D 5/0057; B01D 5/006; B01D 5/009; B01D 5/0093; B01D 53/00; B01D 53/002
See application file for complete search history.

(56) References Cited

U.S. PATENT DOCUMENTS

| | | | |
|---|---|---|---|
| 3,122,496 A * | 2/1964 | Harper | ..................... C10G 5/04 196/99 |
| 5,360,533 A | 11/1994 | Tagamolia | |

(Continued)

*Primary Examiner* — Prem C Singh
*Assistant Examiner* — Brandi M Doyle
(74) *Attorney, Agent, or Firm* — Paschall & Maas Law Office, LLC; James C. Paschall

(57) ABSTRACT

The present subject matter relates generally to processes for propylene recovery. More specifically, the present subject matter relates to processes for enhanced recovery of propylene and liquid petroleum gas (LPG) from the fuel gas produced in fluid catalytic cracking (FCC) units by minimizing the light ends and propylene in the unstabilized gasoline which is used as lean oil for the primary absorber of the FCC gas concentration unit.

10 Claims, 3 Drawing Sheets

(56) References Cited

U.S. PATENT DOCUMENTS

| | | | |
|---|---|---|---|
| 6,271,433 B1* | 8/2001 | Keady | B01D 3/143 |
| | | | 208/347 |
| 2003/0075485 A1* | 4/2003 | Ghijsen | C10G 70/04 |
| | | | 208/308 |
| 2009/0112029 A1 | 4/2009 | Schultz | |
| 2012/0172649 A1* | 7/2012 | Yadav | C10G 11/18 |
| | | | 585/809 |

* cited by examiner

PROCESS FOR IMPROVING PROPYLENE RECOVERY FROM FCC RECOVERY UNIT

CROSS-REFERENCE TO RELATED APPLICATIONS

This application is a Continuation of copending International Application No. PCT/US2016/063923 filed Nov. 29, 2016, which application claims priority from U.S. Provisional Application No. 62/268,041 filed Dec. 16, 2015, the contents of which cited applications are hereby incorporated by reference in their entirety.

FIELD

The present subject matter relates generally to processes for propylene recovery. More specifically, the present subject matter relates to processes for enhanced recovery of propylene and liquid petroleum gas (LPG) from the fuel gas produced in fluid catalytic cracking (FCC) units by minimizing the light ends and propylene in the unstabilized gasoline which is used as lean oil for the primary absorber of the FCC gas concentration unit.

BACKGROUND

In FCC units, most of the propylene leaves the FCC fractionator overhead receiver in the vapor phase, from which it is recovered in downstream FCC gas concentration facilities. By virtue of the mixing which takes place between liquid and vapor phases in conventional overhead condensing and receiving steps, the liquid phase leaving the receiver carries with it a considerable amount of propylene and light ends. The liquid is the unstabilized gasoline which is used as the lean oil for the primary absorber of FCC gas concentration unit. The presence of light ends and propylene in the unstabilized gasoline increases the load on the primary absorber and this will result in losses of propylene to fuel gas and less propylene recovery. Increased loss is experienced when the unit operating pressures at main column receiver are increased in view of the fact that the liquid-vapor equilibrium at higher pressures favors more propylene in the liquid phase. The same concept for minimizing propylene in unstabilized gasoline before routing to primary absorber was discovered by UOP and discussed in U.S. Pat. No. 3,893,905.

The equipment requirements discussed in U.S. Pat. No. 3,893,905 is a modification in the design of FCC fractionator overhead receiver condensers. This produce complexity in the design and not possible for existing FCC units. The present invention uses a simpler equipment design which can be used for existing FCC units.

In the traditional process, the product mixture from FCC main column overhead comprising gasoline, LPG, and fuel gas are first condensed and gravity separated to produce unstabilized gasoline, which is subsequently used in the primary absorber to absorb propylene and LPG from fuel gas. However, high recoveries of propylene become more difficult or uneconomical using traditional processes for recovery due to the presence of light ends and propylene in the unstabilized gasoline. Propylene in unstabilized gasoline can range from about 2 mol % to about 5 mol % or above.

The present invention reduces the amount of propylene and LPG lost in FCC units operating either at lower or higher pressures. In the embodiments of this invention a primary absorber feed flash drum decreases the propylene and light ends in unstabilized gasoline and when it is routed to the primary absorber more propylene and LPG are recovered.

SUMMARY

One embodiment of the invention comprises a process for the recovery of propylene comprising (i) contacting a hydrocarbon feed with a catalyst in a fluid catalytic cracking process to produce a product stream; (ii) distilling the product stream in a fractionator to obtain heavier liquid products as side/bottom draws and a gaseous top product; (iii) cooling and condensing the gaseous top product and thereafter, separating the obtained gas-liquid mixture in a receiver to obtain a liquid fraction and a lighter gaseous fraction; (iv) sequentially sending the gaseous fraction obtained from step (iii) to a wet gas compressor train; (v) feeding a first portion of the liquid fraction obtained in step (iii) back to the fractionator; (vi) feeding a second portion of the liquid fraction obtained in step (iii) to at least one heat exchanger to produce a heated stream; and (vii) feeding the heated stream to a flash drum to produce a flashed light ends stream to be sent back to the wet gas compressor in step (iv) and a bottoms liquid stream wherein the bottoms stream is sent to one or more heat exchangers in step (vi) before routing the liquid stream to FCC gas concentration absorber.

An additional embodiment of the invention comprises a process for the recovery of propylene comprising (i) contacting a hydrocarbon feed with a catalyst in a fluid catalytic cracking process to produce a product stream; (ii) distilling the product stream in a fractionator to obtain heavier liquid products as side/bottom draws and a gaseous top product; (iii) cooling and condensing the gaseous top product and thereafter, separating the obtained gas-liquid mixture in a receiver to obtain a liquid fraction and a lighter gaseous fraction; (iv) sequentially sending the gaseous fraction obtained from step (iii) to a wet gas compressor; (v) feeding a first portion of the liquid fraction obtained in step (iii) back to the fractionator; (vi) feeding a second portion of the liquid fraction obtained in step (iii) to at least one heat exchanger to produce a heated stream; and (vii) feeding the heated stream to a split shell flash drum having a first side and a second side wherein the heated stream is sent to the first side of the split shell to produce a first flashed light ends stream to be sent back to the wet gas compressor in step (iv) and a first bottoms stream wherein the bottoms stream is heated and sent to the second side of the split shell flash drum to produce a second flashed light ends stream to be sent back to the wet gas compressor in step (iv) and a second bottoms stream wherein the second bottoms stream is sent to one or more heat exchangers in step (vi) before routing liquid stream to FCC gas concentration absorber.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DEFINITIONS

As used herein, the term "stream", "feed", "product", "part" or "portion" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated $C_1$, $C_2$, $C_3$, Cn where "n" represents the number of carbon atoms in the one or more hydrocarbon molecules or the abbreviation may be used as an adjective for, e.g., non-aromatics or compounds. Similarly, aromatic compounds may be abbreviated $A_6$, $A_7$, $A_8$, An where "n" represents the number of carbon atoms in the one or more aromatic molecules. Furthermore, a superscript "+" or "−" may be used with an abbreviated one or more hydrocarbons notation, e.g., $C_{3+}$ or $C_{3-}$, which is inclusive of the abbreviated one or more hydrocarbons. As an example, the abbreviation "$C_{3+}$" means one or more hydrocarbon molecules of three or more carbon atoms.

As used herein, the term "zone" can refer to an area including one or more equipment items and/or one or more sub-zones. Equipment items can include, but are not limited to, one or more reactors or reactor vessels, separation vessels, distillation towers, heaters, exchangers, tubes, pumps, compressors, and controllers. Additionally, an equipment item, such as a reactor, dryer, or vessel, can further include one or more zones or sub-zones.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The following detailed description is merely exemplary in nature and is not intended to limit the application and uses of the embodiment described. Furthermore, there is no intention to be bound by any theory presented in the preceding background or the following detailed description.

Figure 1:
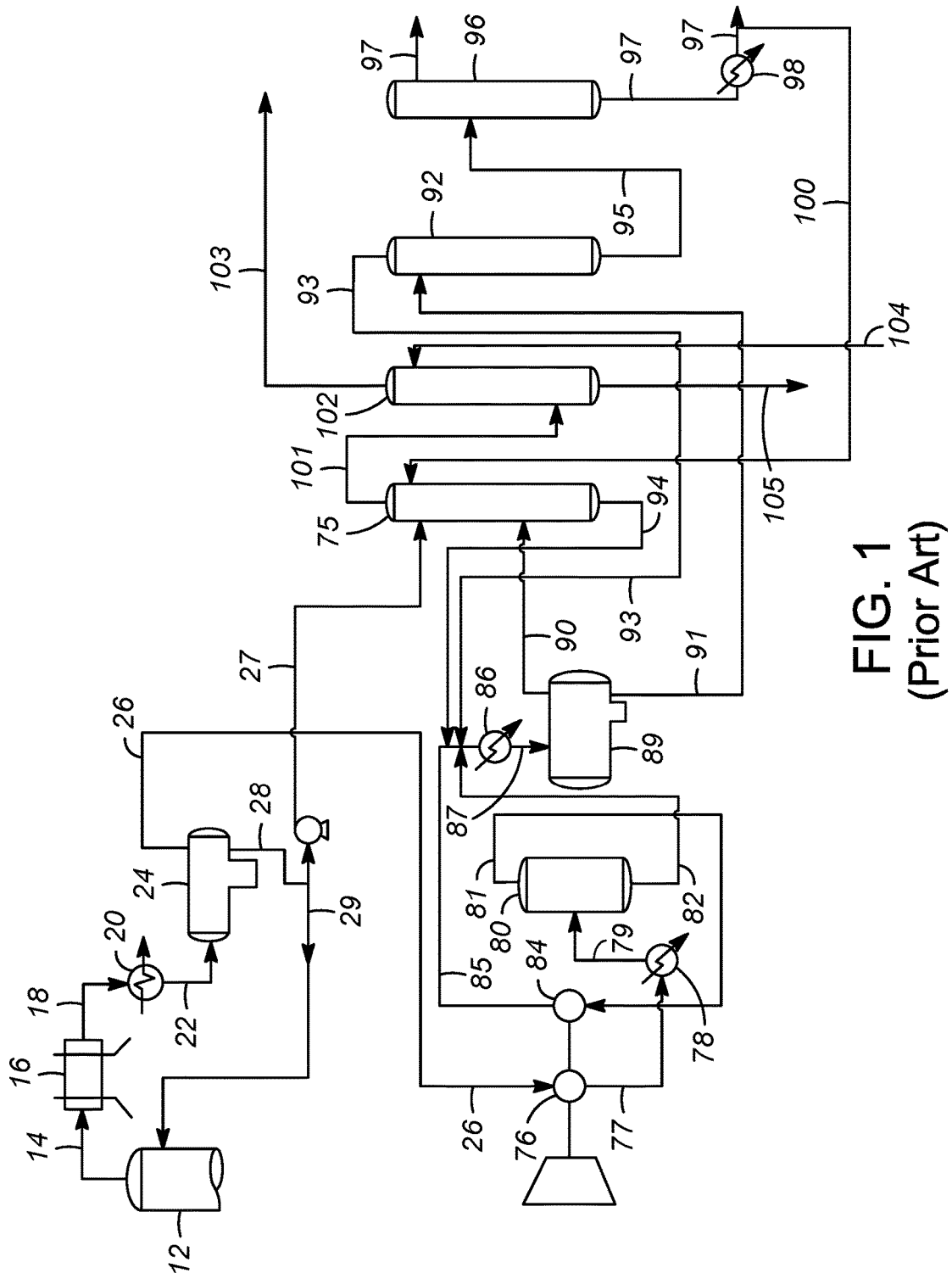
FIG. 1 illustrates the prior art process.

FIG. 1 illustrates a diagram of various embodiments of the processes described herein. Those skilled in the art will recognize that this process flow diagram has been simplified by the elimination of many pieces of process equipment including for example, heat exchangers, process control systems, pumps, fractionation column overhead, reboiler systems and reactor internals, etc. which are not necessary to an understanding of the process. It may also be readily discerned that the process flow presented in the drawing may be modified in many aspects without departing from the basic overall concept. For example, the depiction of required heat exchangers in the drawing has been held to a minimum for purposes of simplicity. Those skilled in the art will recognize that the choice of heat exchange methods employed to obtain the necessary heating and cooling at various points within the process is subject to a large amount of variation as to how it is performed. In a process as complex as this, there exists many possibilities for indirect heat exchange between different process streams. Depending on the specific location and circumstance of the installation of the subject process, it may also be desired to employ heat exchange against steam, hot oil, or process streams from other processing units not shown on the drawing.

Existing process for recovering gaseous products from the product mixture obtained by contacting a hydrocarbon feed with a catalyst in a fluid catalytic cracking process is shown in FIG. 1. Gaseous mixture from top of main fractionator 12 is supplied to overhead cooler-condenser 16 via gas conduit 14. Gas-liquid fractions thus obtained are separated in overhead receiver drum separator 24. The separated liquid fraction referred to as unstabilized naphtha is supplied as lean oil to primary absorber 75 via liquid conduit 27. The gaseous fraction is supplied via conduit 26 to suction of the first stage compressor 76. The discharge stream via conduit 77 after getting cooled in inter-stage cooler 78 being separated into gas and liquid fractions in inter-stage drum 80. The gas fraction from inter-stage drum 80 is supplied via conduit 81 to second stage compressor 84. The inter-stage liquid fraction from inter-stage drum 80 via conduit 82 is combined in conduit 85 with the gaseous fraction compressed in second stage 84. The combined stream in conduit 85 is further joined by rich oil stream liquid from primary absorber 75 via conduit 94 and the overhead gaseous fraction from stripper 92 via conduit 93. The resultant stream 87 after it is cooled in high pressure cooler 86 is separated into gas and liquid fractions in high pressure receiver separator 89.

The liquid fraction obtained from separator 89 is fed via conduit 91 to a stripper 92 wherein components lighter than ethane are stripped off from the feed and are recycled back via conduit 93 to high pressure separator 89. Bottoms of stripper 92 are fed via conduit 95 to a debutanizer column 96 where components lighter than butane present in the feed are separated as column overheads and are fed further to a propylene separation unit via conduit 97. Bottom of debutanizer 96 in conduit 97 after being cooled in exchanger 98 to about 38° C. to about 40° C. is split to gasoline recycle and supplied to primary absorber 75 via conduit 100.

Gaseous fraction from the high pressure separator 89, comprising of lighters and $C_3$-$C_5$ components, is fed via conduit 90 to the bottom of primary absorber 75 wherein $C_3$-$C_5$ components are absorbed by the down-flowing lean absorber oil. The gaseous fraction obtained from primary absorber 75 is fed via conduit 101 to sponge absorber 102. Using light cycle oil as lean oil via conduit 104 in sponge absorber 102, the resulted gas fraction in conduit 103 from sponge absorber 102 contains light gases of $C_2$ and lighter and some losses of $C_3$. The absorbed hydrocarbons in sponge absorber 102 are recycled back to main fractionators via conduit 105.

As explained above, the existing process for recovering gaseous products from the product mixture obtained by contacting a hydrocarbon feed with a catalyst in a fluid catalytic cracking process uses unstabilized gasoline from main fractionator overhead receiver as lean oil to gas concentration primary absorber. However, by heating up the unstabilized gasoline and flashing the lighter ends and the propylene before routing to primary absorber will increase the total propylene recovery in the gas concentration unit. This design not only improves the recovery of propylene, but it is more economical to use a flash drum as opposed to other traditional methods used in gas concentration units and mainly gasoline recycle from the debutanizer which increases equipment sizes and utilities. This design will increase the load on the wet gas compressor by about 2% to about 5% but it is much more economical than increasing the gasoline recycle in gas concentration unit. For new units design the increase in propylene recovery becomes uneconomical using traditional methods at certain level.

For existing units the investment to increase propylene recovery will be too large and requires many equipment modifications. With this invention and for new units design propylene recovery near 99.6% are economically possible. For existing units, propylene recovery can be increased by nearly 1% without modifications for existing equipment. The extra load on the existing wet compressor of about 2% to about 5% can be accommodated by slightly changing the suction operating pressure if the compressor is near its maximum limit. For existing FCC units, the new equipment can be designed and installed in typical turnaround or in some cases may be while the unit is in operation. In addition for existing units with equipment limitations of stripper, debutanizer, stripper reboiler, debutanizer reboiler and debutanizer overhead condenser, it will be possible to reduce the gasoline recycle and maintain same $C_3$ recovery. This will allow more feed to the gas concentration unit or more propylene production at FCC reactor.

Figure 2:
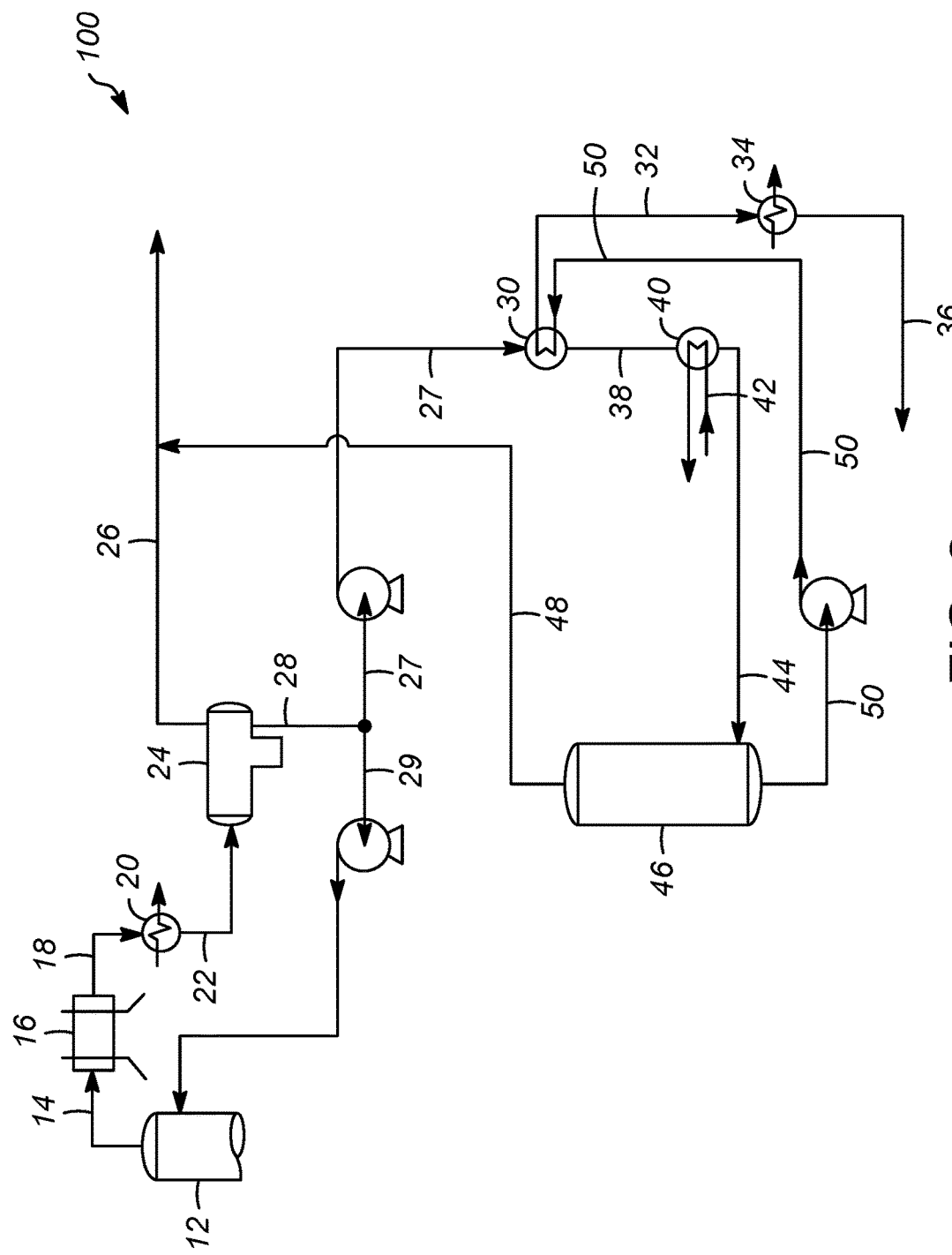
FIG. 2 is an illustration of the overall flow scheme of the system for improving propylene recovery from FCC gas using a flash drum for unstabilized gasoline before routing it to the primary absorber of gas concentration unit.

As illustrated in the preferred embodiment in FIG. 2, a process 100 for the recovery of propylene is depicted. In this embodiment, a gaseous mixture in conduit 14 from the top of main fractionator 12 is supplied to an overhead air cooler 16 and is then supplied to a cooler-condenser 20 via gas/liquid conduit 18. Gas-liquid fractions thus obtained are separated in a overhead receiver 24. The separated liquid fraction unstabilized gasoline leaves the receiver 24 via liquid conduit 28 while the gas leaves the receiver via conduit 26 to wet gas compressor. The unstabilized gasoline via conduit 28 is split and a portion of the liquid fraction in conduit 29 is sent back to the main fractionator 12. The net unstabilized gasoline liquid fraction in conduit 27 is then heated via feed/bottoms exchanger 30. The resultant stream in conduit 38 obtained from heat exchanger 30 is fed to heat exchanger 40 for further heating by a stream in conduit 42. The stream of conduit 42 can either be a process stream or LP steam. Liquid gas mixture from heat exchanger 40 is fed via conduit 44 to a flash drum 46.

The gaseous fraction in conduit 48 obtained from flash drum 46 is supplied to conduit 26 before the wet gas compressor. The flash drum vapor in conduit 48 contain light ends and nearly 70% of the propylene in the flash drum feed from conduit 44. The flash drum liquid in conduit 50 is pumped to feed/bottoms exchanger 30, cooled in a water cooler 34 to about 35° C. to about 40° C. and then routed to primary absorber. Therefore, the liquid to the primary absorber has less light material and propylene and therefore less loading on primary absorber which results in higher propylene recovery for the gas concentration unit.

Figure 3:
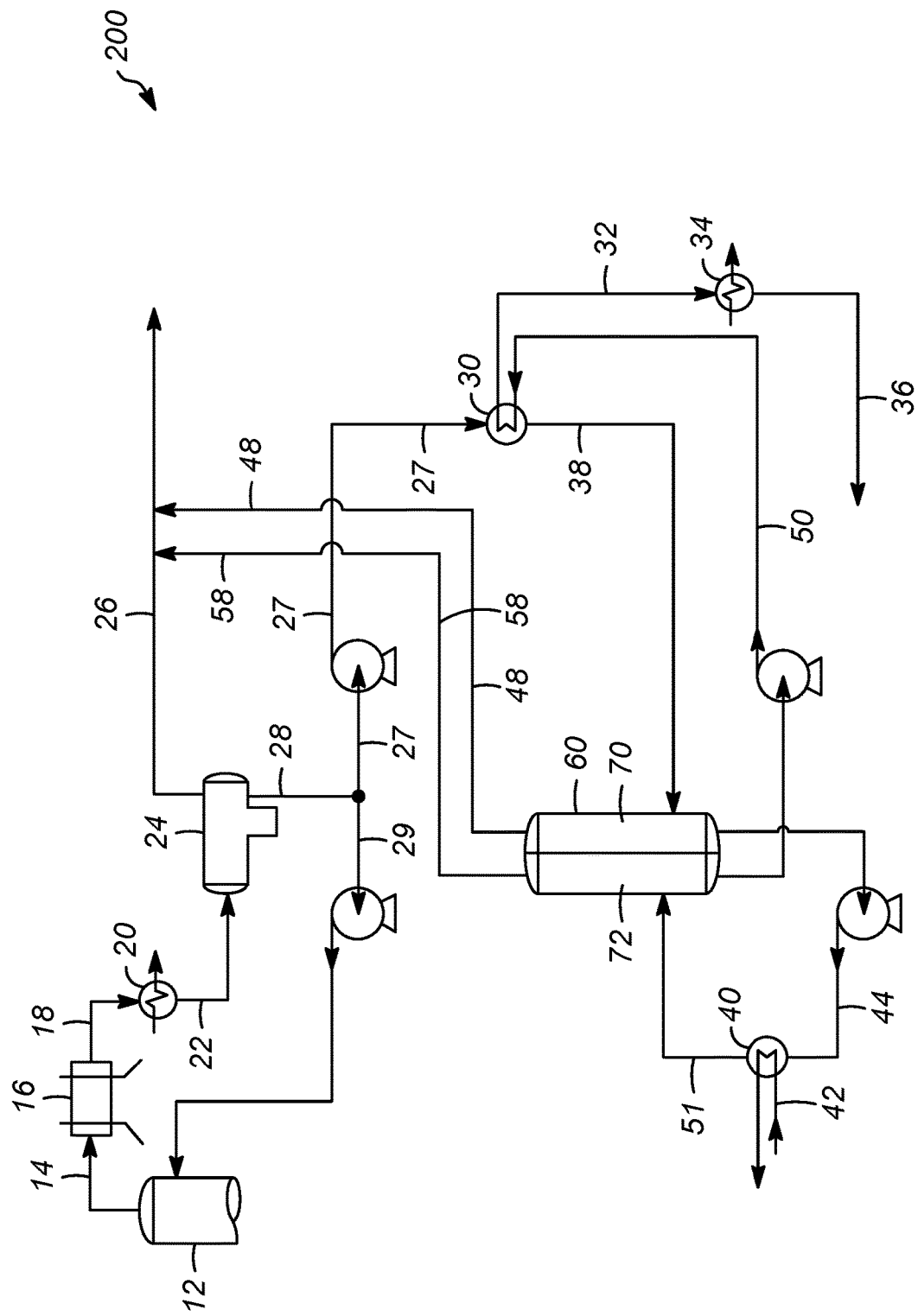
FIG. 3 is an illustration of the overall flow scheme of the system for improving propylene recovery from FCC gas using a split shell flash drum for unstabilized gasoline before routing it to the primary absorber of gas concentration unit.

As illustrated in another preferred embodiment in FIG. 3, a process 200 for the recovery of propylene is depicted. In this process a two stage flash for unstabilized gasoline is used before routing to gas concentration unit primary absorber. In this embodiment, a gaseous mixture in conduit 14 from the top of main fractionator 12 is supplied to an overhead air cooler 16 and is then supplied to a cooler-condenser 20 via gas/liquid conduit 18. Gas-liquid fractions thus obtained are separated in a overhead receiver 24. The separated liquid fraction unstabilized gasoline leaves the receiver 24 via liquid conduit 28 while the gas leaves the receiver via conduit 26 to wet gas compressor. The unstabilized gasoline via conduit 28 is split and a portion of the liquid fraction in conduit 29 is sent back to the main fractionator 12. The net unstabilized gasoline liquid fraction in conduit 27 is then heated via feed/bottoms exchanger 30. The resultant stream in conduit 38 obtained from heat exchanger 30 is fed to a split shell flash drum 60. The flash drum illustrated in FIG. 2 comprises a split shell flash drum having a first side 70 and a second side 72 wherein the first side 70 and the second side 72 are completely separated by a vertical wall and the contents of the first side and the second side do not come in contact with each other. The gaseous fraction in conduit 48 obtained from flash drum 60 and side 70 is supplied to conduit 26 before the wet gas compressor.

The first bottom stream 44 from the first side 70 of the split shell flash drum 60 is pumped via conduit 44 to heat exchanger 40 for further heating by a stream in conduit 42. The stream of conduit 42 can either be a process stream or LP steam. The resultant stream from exchanger 40 leaves via conduit 51 and send to the second side 72 of the split shell flash drum 60. The second overhead stream 58 from the second side 72 of the split shell flash drum 60 is supplied to conduit 26 before the wet gas compressor. The second bottoms stream 50 from the second side 72 of the split shell flash drum 60 is pumped to feed/bottoms exchanger 30, cooled in a water cooler 34 to about 35° C. to 40° C. and then routed to primary absorber. Therefore, the liquid to the primary absorber has less light material and propylene and therefore less loading on primary absorber which results in higher propylene recovery for the gas concentration unit.

EXAMPLES

The following examples are intended to further illustrate the subject embodiments. These illustrations of different embodiments are not meant to limit the claims to the particular details of these examples.

Example 1

An FCC unit was designed as per the prior art flow scheme. It was possible to achieve propylene recovery of 98.93 mol %. Any additional propylene recovery using traditional methods was not possible and was not economical. By adding the new invention to the design of the unit, it was possible to achieve higher recovery which resulted in higher revenue and payback of a few months based on new equipment cost. A comparison of base case vs. the case with the additional of new equipments is shown in Table 1.

TABLE 1

|  | Base Case | New case: Base Case with the addition of new equipment | Delta New vs. Base |
|---|---|---|---|
| Propylene Recovery, % | 98.93 | 99.61 | 0.68 |
| Propylene Recovered, Metric T/year | 735848.1 | 740848.3 | 5000.2 |
| Propane Recovered, Metric T/year | 118510.8 | 119091.5 | 580.7 |
| Value of delta Propylene & propane recovered, MM$/year |  | 5.86 |  |

TABLE 1-continued

|  | Base Case | New case: Base Case with the addition of new equipment | Delta New vs. Base |
|---|---|---|---|
| Loss of value of Propylene & propane in Fuel Gas MM$/year |  | −1.21 |  |
| Operating Cost using LP steam, MM$/year |  | −1.5 |  |
| Net Revenue, MM$/year |  | 3.15 |  |
| Equipment Cost, MM$ |  | 0.86 |  |
| Payback based on equipment cost, Months |  | 3 to 4 |  |

As shown in the above Table 1, with new invention it was possible to achieve higher propylene recovery and the payback for the new equipment investment is expected to be a few months. In addition, the above analysis was done for the worst case scenario using LP steam for heating the unstabilized gasoline. In most cases it will be possible to heat up the unstabilized gasoline with a waste heat process stream available in the gas recovery or FCC main fractionation section. This will increase the yearly revenue from MM$3.15 to MM$4.65

Another analysis we performed is the affect of the new invention on gasoline recycle.

For same propylene as the base case of example 1 and with the addition of flash drum, it was possible to reduce gasoline recycle from the debutanizer to absorber by 50%. This has a big saving in equipment sizes and utilities on the gas concentration equipment like primary absorber, stripper, debutanizer, stripper reboiler, debutanizer reboiler/overhead condenser and gas concentration unit water coolers.

Example 2

For existing units and if it is desired to reduce the load on wet gas compressor due to capacity limitations, split shell design can be used for the flash drum as illustrated in FIG. 2. The benefit is a reduction of the vapor to wet gas compressor while maintaining same recovery in gas concentration unit. The amount of propylene removed from the unstabilized gasoline is the same as with a single flash drum but amount of vapor going to wet gas compressor will be less as shown in Table 2 below.

TABLE 2

| Unstabilized gasoline flow, kg/h: 257,508 | | | | |
|---|---|---|---|---|
|  | Flash Drum Vapor without Dividing Wall | Flash Drum Dividing Wall Vapor from $1^{st}$ Compartment | Flash Drum Dividing Wall Vapor from $2^{nd}$ Compartment | Flash Drum Dividing wall Total vapor from $1^{st}$ & $2^{nd}$ Compartments |
| Vapor Flow, kg/h | 25671 | 3925 | 18404 | 22329 |
| Vapor Flow as % of Wet Gas Compressor Normal flow | 4.77 | 0.73 | 3.42 | 4.15 |
| Temperature, ° C. | 79 | 60 | 79 | 76 |
| Propylene In vapor, kg/h | 1794 | 567 | 1234 | 1801 |
| Wet Gas Compressor suction temperature(normal flow + flash drum vapor), ° C. | 39.7 |  |  | 39.3 |

As shown in the above table, the flow to wet gas compressor will be reduced when using a split shell or dividing wall drum for nearly the same amount of propylene removal from unstabilized gasoline. In addition the total flow going to wet gas compressor will be slightly at a lower temperature.

It should be noted that various changes and modifications to the presently preferred embodiments described herein will be apparent to those skilled in the art. Such changes and modifications may be made without departing from the spirit and scope of the present subject matter and without diminishing its attendant advantages.

Specific Embodiments

While the following is described in conjunction with specific embodiments, it will be understood that this description is intended to illustrate and not limit the scope of the preceding description and the appended claims.

A first embodiment of the invention is a process for the recovery of propylene comprising (i) contacting a hydrocarbon feed with a catalyst in a fluid catalytic cracking process to produce a product stream; (ii) distilling the product stream in a fractionator to obtain heavier liquid products as side/bottom draws and a gaseous top product; (iii) cooling and condensing the gaseous top product and thereafter, separating the obtained gas-liquid mixture in a receiver to obtain a liquid fraction and a lighter gaseous fraction; (iv) sequentially sending the gaseous fraction obtained from step (iii) to a wet gas compressor train; (v) feeding a first portion of the liquid fraction obtained in step (iii) back to the fractionator; (vi) feeding a second portion of the liquid fraction obtained in step (iii) to at least one heat exchanger to produce a heated stream; and (vii) feeding the heated stream to a flash drum to produce a flashed light ends stream to be sent back to the wet gas compressor in step (iv) and a bottoms liquid stream wherein the bottoms stream is sent to one or more heat exchangers in step (vi) before routing the liquid stream to FCC gas concentration absorber. An embodiment of the invention is one, any or all of prior embodiments in this paragraph up through the first embodiment in this paragraph wherein the one or more heat exchangers heats the liquid fraction from about 38° C. to about 80° C. An embodiment of the invention is one, any or all of prior embodiments in this paragraph up through the first embodiment in this paragraph wherein the flashed light ends stream contains nearly 70% of the propylene in the flash drum feed. An embodiment of the invention is one, any or all of prior embodiments in this paragraph up through the first embodiment in this paragraph wherein one or more of the heat exchanges uses a waste heat process stream. An embodiment of the invention is one, any or all of prior embodiments in this paragraph up through the first embodiment in this paragraph wherein two heat exchangers are used to heat the liquid fraction.

A second embodiment of the invention is a process for the recovery of propylene comprising (i) contacting a hydrocarbon feed with a catalyst in a fluid catalytic cracking process to produce a product stream; (ii) distilling the product stream in a fractionator to obtain heavier liquid products as side/bottom draws and a gaseous top product; (iii) cooling and condensing the gaseous top product and thereafter, separating the obtained gas-liquid mixture in a receiver to obtain a liquid fraction and a lighter gaseous fraction; (iv) sequentially sending the gaseous fraction obtained from step (iii) to a wet gas compressor; (v) feeding a first portion of the liquid fraction obtained in step (iii) back to the fractionator; (vi) feeding a second portion of the liquid fraction obtained in step (iii) to at least one heat exchanger to produce a heated stream; and (vii) feeding the heated stream to a split shell flash drum having a first side and a second side wherein the heated stream is sent to the first side of the split shell to produce a first flashed light ends stream to be sent back to the wet gas compressor in step (iv) and a first bottoms stream wherein the bottoms stream is heated and sent to the second side of the split shell flash drum to produce a second flashed light ends stream to be sent back to the wet gas compressor in step (iv) and a second bottoms stream wherein the second bottoms stream is sent to one or more heat exchangers in step (vi) before routing liquid stream to FCC gas concentration absorber. An embodiment of the invention is one, any or all of prior embodiments in this paragraph up through the second embodiment in this paragraph wherein the one or more heat exchangers heats the liquid fraction from about 38° C. to about 80° C. An embodiment of the invention is one, any or all of prior embodiments in this paragraph up through the second embodiment in this paragraph wherein the flashed light ends stream contains nearly 70% of the propylene in the flash drum feed. An embodiment of the invention is one, any or all of prior embodiments in this paragraph up through the second embodiment in this paragraph wherein one or more of the heat exchanges uses a waste heat process stream. An embodiment of the invention is one, any or all of prior embodiments in this paragraph up through the second embodiment in this paragraph wherein two heat exchangers are used to heat the liquid fraction.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A process for the recovery of propylene comprising:
 (i) contacting a hydrocarbon feed with a catalyst in a fluid catalytic cracking process to produce a product stream;
 (ii) distilling the product stream in a fractionator to obtain heavier liquid products as side/bottom draws and a gaseous top product;
 (iii) cooling and condensing the gaseous top product and thereafter, separating the obtained gas-liquid mixture in a receiver to obtain a liquid fraction and a lighter gaseous fraction;
 (iv) sequentially sending the gaseous fraction obtained from step (iii) to a wet gas compressor train;
 (v) feeding a first portion of the liquid fraction obtained in step (iii) back to the fractionator;
 (vi) feeding a second portion of the liquid fraction obtained in step (iii) to at least one heat exchanger to produce a heated stream; and
 (vii) feeding the heated stream to a flash drum to produce a flashed light ends stream to be sent back to the wet gas compressor in step (iv) and a bottoms liquid stream wherein the bottoms stream is sent to one or more heat exchangers in step (vi) before routing the liquid stream to FCC gas concentration absorber.

2. The process of claim 1 wherein the one or more heat exchangers heats the liquid fraction from about 38° C. to about 80° C.

3. The process of claim 1 wherein the flashed light ends stream contains nearly 70% of the propylene in the flash drum feed.

4. The process of claim 1 wherein one or more of the heat exchanges uses a waste heat process stream.

5. The process of claim 1 wherein two heat exchangers are used to heat the liquid fraction.

6. A process for the recovery of propylene comprising:
 (i) contacting a hydrocarbon feed with a catalyst in a fluid catalytic cracking process to produce a product stream;
 (ii) distilling the product stream in a fractionator to obtain heavier liquid products as side/bottom draws and a gaseous top product;
 (iii) cooling and condensing the gaseous top product and thereafter, separating the obtained gas-liquid mixture in a receiver to obtain a liquid fraction and a lighter gaseous fraction;
 (iv) sequentially sending the gaseous fraction obtained from step (iii) to a wet gas compressor;
 (v) feeding a first portion of the liquid fraction obtained in step (iii) back to the fractionator;
 (vi) feeding a second portion of the liquid fraction obtained in step (iii) to at least one heat exchanger to produce a heated stream; and (vii) feeding the heated stream to a split shell flash drum having a first side and a second side wherein the heated stream is sent to the first side of the split shell to produce a first flashed light ends stream to be sent back to the wet gas compressor in step (iv) and a first bottoms stream wherein the bottoms stream is heated and sent to the second side of the split shell flash drum to produce a second flashed light ends stream to be sent back to the wet gas compressor in step (iv) and a second bottoms stream wherein the second bottoms stream is sent to one or more heat exchangers in step (vi) before routing liquid stream to FCC gas concentration absorber.

7. The process of claim 6 wherein the one or more heat exchangers heats the liquid fraction from about 38° C. to about 80° C.

8. The process of claim 6 wherein the flashed light ends stream contains nearly 70% of the propylene in the flash drum feed.

9. The process of claim 6 wherein one or more of the heat exchanges uses a waste heat process stream.

10. The process of claim 6 wherein two heat exchangers are used to heat the liquid fraction.

* * * * *